CROSS BUS ASSEMBLY

Filed May 27, 1963 4 Sheets-Sheet 1

INVENTORS
FRANK W. KUSSY
GEORGE H. FARNSWORTH
BY
OSTROLENK, FABER, GERB & SOFFEN
ATTORNEYS

INVENTORS
FRANK W. KUSSY
GEORGE H. FARNSWORTH
BY
OSTROLENK, FABER, GERB & SOFFEN
ATTORNEYS

Aug. 16, 1966 F. W. KUSSY ET AL 3,267,336

CROSS BUS ASSEMBLY

Filed May 27, 1963 4 Sheets-Sheet 3

INVENTORS
FRANK W. KUSSY
BY GEORGE H. FARNSWORTH

OSTROLENK, FABER, GERB & SOFFEN
ATTORNEYS

INVENTORS
FRANK W. KUSSY
GEORGE H. FARNSWORTH
BY
OSTROLENK, FABER, GERB & SOFFEN
ATTORNEYS

United States Patent Office 3,267,336
Patented August 16, 1966

3,267,336
CROSS BUS ASSEMBLY

Frank W. Kussy, Birmingham, and George H. Farnsworth, Grosse Pointe Woods, Mich., assignors to I-T-E Circuit Breaker Company, Philadelphia, Pa., a corporation of Delaware Filed May 27, 1963, Ser. No. 283,180
13 Claims. (Cl. 317—120)

The instant invention relates to panel boards in general and more particularly to a cross bus assembly which facilitates both electrical and mechanical securement of an electrical device to a panel board.

Typical industrial panel boards are constructed with a plurality of vertically extending bus bars positioned between a pair of mounting rails with these elements being mounted within a vertically extending elongated housing. The rails are spaced from the sides of the housing so as to provide gutters for making electrical connections from electrical devices mounted to the panel board to points external of the panel board as well as between other devices mounted to the panel board. Heretofore, in panel boards of the type to be hereinafter described, it has been necessary to first install three separate cross buses to the vertically extending bus bars. These three cross buses had to be carefully spaced and aligned so that they would mate properly with the line connections on the electrical device to be installed.

It is also noted that in panel boards of this type vertical space is at a premium. Notwithstanding this, prior art contactor-switch arrangements were such that valuable vertical panel board space was often wasted. That is, as shown in FIGURE 1 of the drawings, two switches were mounted in a common housing extending across the panel board and two contactors were mounted in another common housing extending across the panel board. It was necessary to extend jumpers between the housing in order to connect a contactor in one housing with a switch in the other housing. This increased the amount of field wiring required.

In addition when only a single contactor-switch combination was required two vertical panel board spaces were occupied even though the switch housing was only half occupied and the contactor housing was only half occupied.

Accordingly, a primary object of this invention is to provide a panel board mounting arrangement which overcomes the deficiencies of the prior art, previously noted.

Another object is to provide a panel board arrangement in which there is novel means for mounting a switch-contactor arrangement contained in a single housing which extends transverse to the bus bars of the panel board.

Still another object is to provide a novel construction for a cross bus assembly.

A further object is to provide a cross bus assembly which makes it possible to mechanically and electrically connect an electrical device to a panel board from the front thereof.

A still further object is to provide a removable cross bus assembly for a panel board with all mechanical connections and bolted electrical connections between the assembly and the panel board being made from the front of the panel board.

Yet another object is to provide a panel board having electrical units extending between mounting rails with the housings of these units all being of the same width.

Another object is to provide electrical units having straight through internal wiring with bus connections at one end of the unit and load connections at the opposite end of the unit.

These as well as other objects of this invention shall become readily apparent after reading the description of the accompanying drawings in which.

Figure 1:
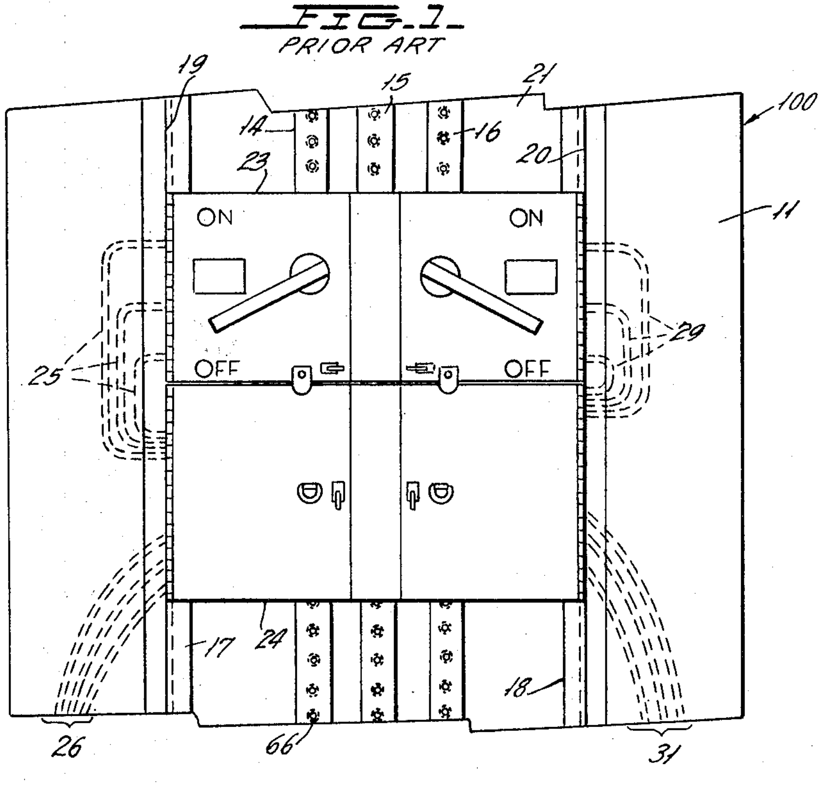
FIG. 1 PRIOR ART
FIGURE 1 is a fragmentary view in elevation showing a panel board with switches and contactors mounted thereto as in the prior art.

Now referring to the figures: As previously noted, FIGURE 1 illustrates switch contactor arrangement mounted to a panel board in accordance with the teachings of the prior art. The panel board 100 of FIGURE 1 includes elongated vertically extending housing 11 of substantially rectangular cross-section. A plurality of longitudinally spaced insulating blocks 12 are mounted to the inner back surface 13 of housing 11 (see FIGURE 4) by a means well-known to the art.

Bus bars 14, 15 and 16 are secured to insulators 12, by means not shown, in spaced parallel relationship and extending parallel to the longitudinal axis of housing 11. Also mounted to back wall 13 are a pair of Z-shaped rails 17, 18 also extending parallel to the longitudinal axis of housing 11. Rails 17, 18 are substantially in line with the inward edges 19, 20 of the housing removable front surface which defines a longitudinally extending opening 21 in the front surface of housing 11.

Enclosure 23, extending horizontally acoss panel board opening 21, houses two switch units each of which are separately connected to bus bars 14–16 by means not shown. Enclosure 24, extending horizontally across opening 21, contains two separate contactor units. Jumpers 25 extend through wiring gutter 27 to the left rail 17 between enclosures 23 and 24 to connect one of the switches of one of the contactors. Cable 26 extends from this contactor to the circuit being protected. Similarly, jumpers 29 extending through wiring gutter 28 to the right of rail 18 connect the other switch to the other contactor and cable 31 connects this contactor to the circuit to be protected.

Figure 2:
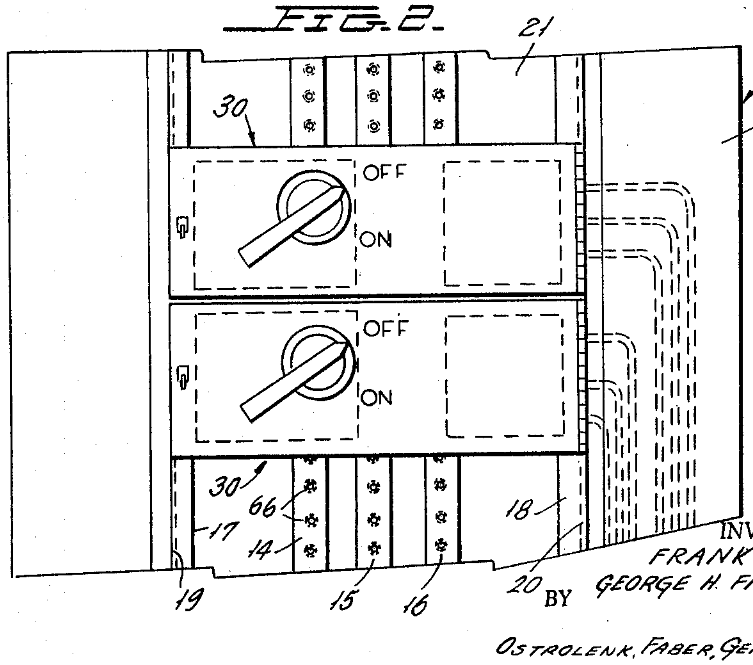
FIGURE 2 is a view similar to FIGURE 1 with the switches and contactors mounted in accordance with the teachings of the instant invention.

In FIGURE 2 there is shown a pair of identical combination units 30 mounted to panel board 100. Combination units of this type are described in detail in issued Patent No. 3,158,789, issued on November 24, 1964, entitled Circuit Protector, and assigned to the assignee of the instant invention.

Figure 3:
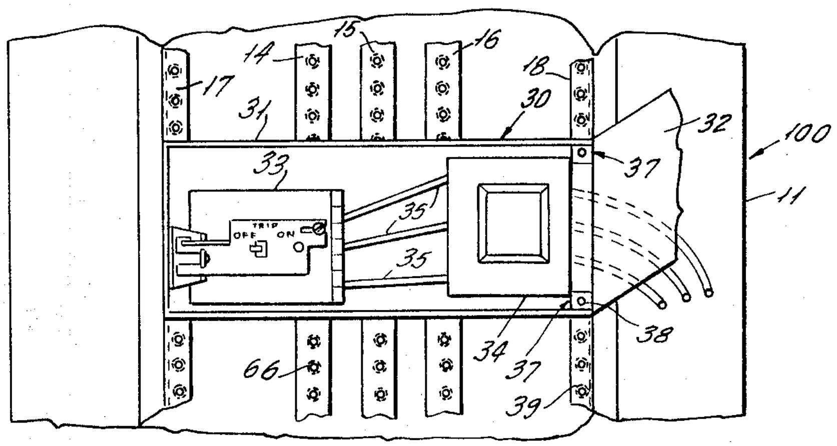
FIGURE 3 is an elevation showing one of the combination switch-contactor units of FIGURE 2 mounted to the panel board with the cover of the combination enclosure being open.
Figure 4:
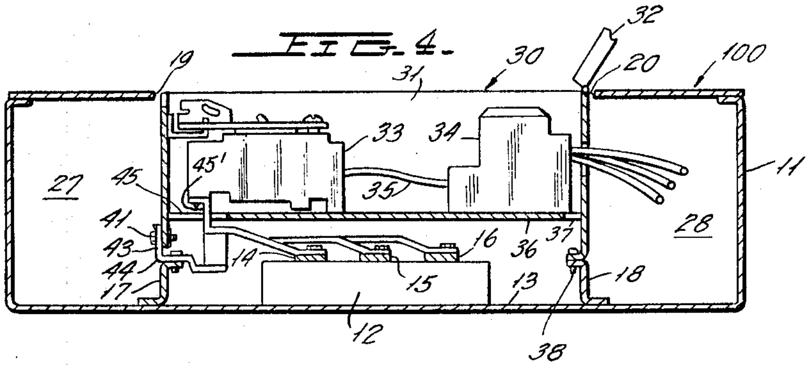
FIGURE 4 is an end view of the elements of FIGURE 3 with the bottom wall of the combination unit housing broken away to reveal certain internal elements.
Figure 5:
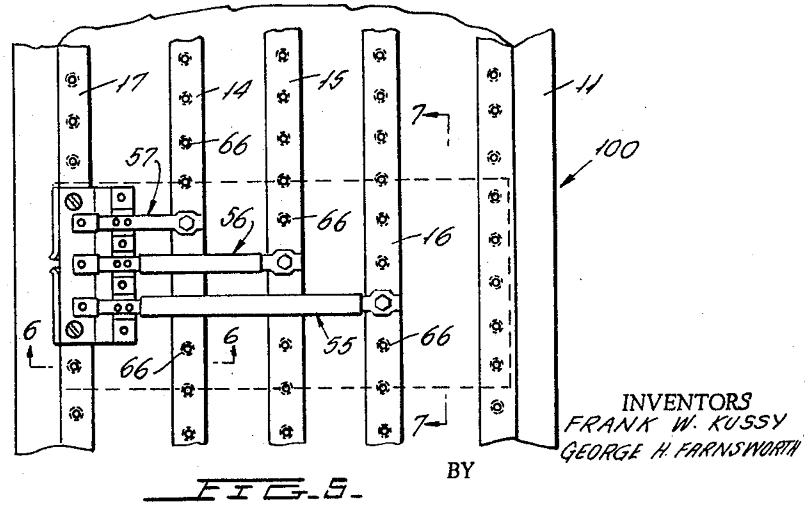
FIGURE 5 is an elevation showing a removable cross bus assembly mounted to the panel board.
Figure 11:
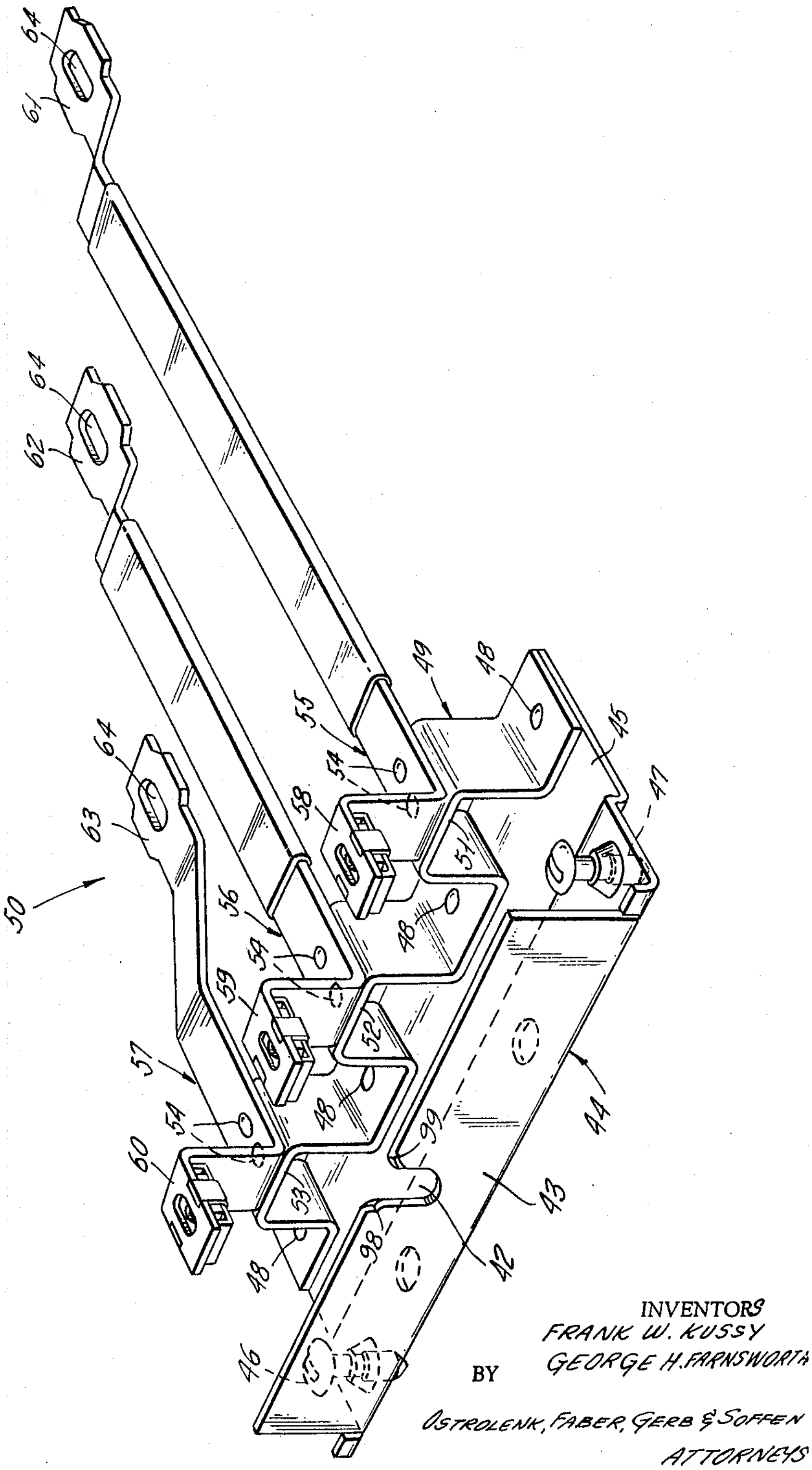
FIGURE 11 is a perspective of the cross bus assembly.

In FIGURES 3 and 4 combination unit 30 is provided with a rectangular housing 31 having a hinged front cover 32. Circuit breaker 33 and contactor 34 are mounted within housing 31 and are electrically interconnected by three jumpers 35. Back wall 36 of housing 31 is provided with openings 37 through which the heads of bolts 38 are accessible. Bolts 38 extend through clearance apertures of the inward lip at the rear of housing 31 and are received by threaded apertures 39 in the forward leg of mounting rail 18 to mechanically secure one end of combination unit 30. The other end of combination unit 30 is mechanically secured in place by bolt 41 which extends through slot 42 (FIGURE 11) in leg 43 of bracket 44 and is received by a threaded aperture in the other end of housing 31. Back wall 36 of housing 31 is provided with aperture 45' through which electrical connectors extend for electrically connecting circuit breaker 33 to bus bars 14–16, as will be hereinafter explained.

Bracket 44 is one of the elements which comprises removable cross bus assembly 50 illustrated most clearly in FIGURES 5 through 11. Bracket 44 is a somewhat elongated generally L-shaped member. Captured bolts 46, 47 are carried by bracket leg 45 at the portion thereof adjacent to bracket leg 43. Rivets 48, at the valleys of the corrugation-like formations of insulating member 49, secure member 49 to bracket leg 45 adjacent to the free edge thereof. Insulating member 49 includes three crown portions 51–53. Rivets 54 fixedly secure conducting strap 55 near one end thereof to crown 51. Similarly, additional rivets 54 fixedly secure conducting straps 56 and 57 to crowns 52 and 53, respectively.

Figures 6, 8, 9, 10:
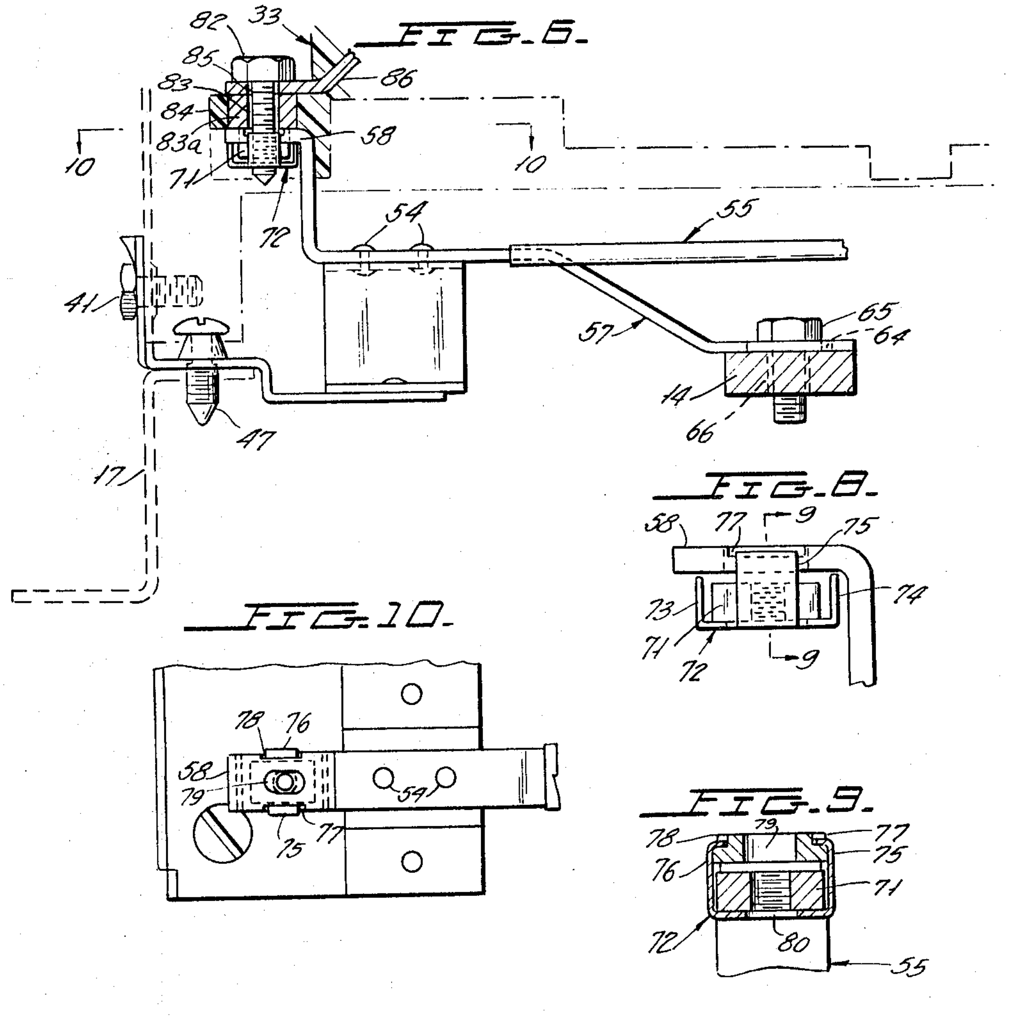
FIGURE 6 is an enlarged fragmentary bottom view of the removable cross bus assembly looking in the direction of arrows 6—6 of FIGURE 5.
FIGURE 8 is an enlarged elevation showing the manner in which a nut is floatingly mounted to a strap of the cross bus assembly.
FIGURE 9 is a cross-section taken through line 9—9 of FIGURE 8 looking in the direction of arrows 9—9.
FIGURE 10 is a fragmentary view of the cross bus assembly taken through line 10—10 of FIGURE 6 looking in the direction of the arrows 10—10.
Figure 7:
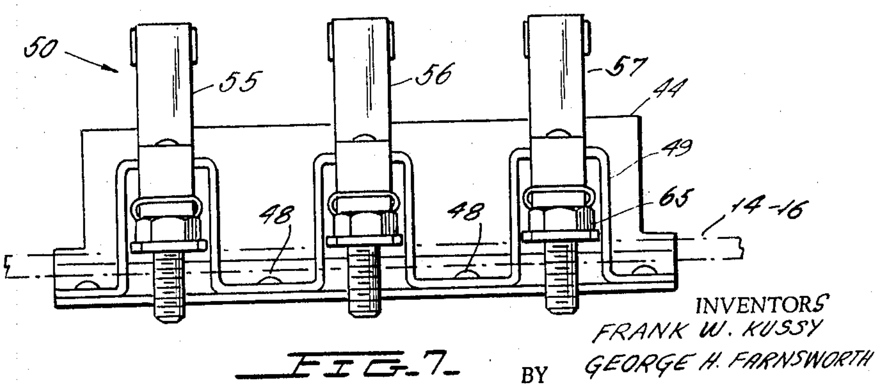
FIGURE 7 is an end view of the cross bus assembly looking in the direction of arrows 7—7 of FIGURE 5.

The ends of straps 55–57 secured to insulator 49 are each provided with forwardly offset portions 58–60, respectively, so as to be positioned in coplanar relationship. The other ends 61–63 of straps 55–57, respectively, are rearwardly offset and are in coplanar relationship in a plane substantially parallel to the plane containing forward offsets 58–60. Each of the rear offsets is provided with an elongated clearance aperture 64 through which the body of bolt 65 extends (FIGURE 6). Each of the bolts 65, after extending through an aperture 64, is received by a threaded bus bar aperture 66 for electrically securing the cross-straps 55–57 to bus bars 14–16. As clearly seen in FIGURE 5, cross-straps 55–57 each differ in length, with strap 55 being long enough to extend over bus bars 14 and 15 and be secured to bus bar 16 most remote from rail 17 while strap 56 extends over bus bar 14 and is electrically connected to center bus bar 15. Strap 57 extends only far enough to be connected to the bus bar 14 closest to mounting rail 17. It is noted that portions of straps 55 and 56 passing over bus bars 14 and 15 are insulation covered.

On the other hand, forwardly offset portions 58–60 of straps 55–57 are aligned parallel to bus bars 14–16. Each of the forward offsets carries a nut 71 which is secured thereto in floating relationship by means of spring member 72. Since all three nuts 71 are mounted in the same manner, for the sake of brevity only the mounting of nut 71 to strap 55 will be described.

Member 72, as most clearly seen in FIGURES 6 and 8 through 10, is constructed with cross arms having forwardly turned ends. The ends of opposed arms 73, 74 abut the rear surface of forward offset 58 while the forward ends of arms 75 are inturned and are received by depressions 77, 78, respectively, in the forward service of offset 58. Thus, it is seen that member 72 in cooperation with forward offset 58 forms a cage for nut 71. Offset 58 is provided with elongated clearance aperture 79 aligned with the threaded aperture of nut 71 which in turn is aligned with clearance aperture 80 at the rear of member 72.

Bolt 82 extends through clearance aperture 83 of insert 83*a* secured to circuit breaker housing 84 and also extends through clearance aperture 85 in circuit breaker line terminal 86 before being received by the threaded aperture of nut 71. Upon the tightening of bolt 82 it is seen that nut 71 is drawn forward thereby forcing strap portion 58 into firm engagement with circuit breaker terminal 86 thereby forming a good electrical connection between circuit breaker 33 and cross strap 55. Electrical connections are made from other terminals of circuit breaker 33 to cross straps 56 and 57 are made in the same manner.

It is noted that with bolt 41 (FIGURE 4) located in bracket notch 42 combination unit 30 is positioned so that the circuit breaker line terminals are aligned with the forward offsets 58–60. It is noted that bracket 44 is deformed at the forward end of slot 42 with the deformations 98, 99 being positioned so as to block upward movement of bolt 41 after it has been tightened to a reasonable extent.

It is noted that panel board 100 is of conventional construction with the front panels of housing 11 which define wiring gutters 27 and 28 being removable. By comparing FIGURES 1 and 2 it is seen that by utilizing removable cross strap assembly 50, a combination unit 30 may be mounted to panel board 100 by making all electrical and mechanical connections from the front. This represents a considerable saving of effort in the field. Further, field effort is conserved by reducing the necessity for making the interdevices connections 25 and 29 shown in FIGURE 1.

Althrough there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A cross bus assembly having a unitary structure independent of a circuit breaker and a panelboard comprising a bracket, insulating means secured to said bracket, a plurality of conducting straps at least three in number each secured at an intermediate portion thereof to said insulating means and extending to one side of said bracket, said plurality of straps being positioned with first ends thereof in a first plane and second ends thereof in a second plane offset from said first plane, said first ends of each of said straps being approximately the same distance from said insulating means thereby being aligned in a row, said straps being of different length whereby said second ends are each a different distance from said bracket.

2. The assembly of claim 1 also comprising means carried by said bracket for mechanically securing said assembly to a panel mounting rail.

3. The assembly of claim 1 also comprising a nut individual to each of said straps for making electrical connections to said straps, means floatingly securing said nuts to their individual straps at their first ends.

4. The assembly of claim 1 in which the insulating means is a corrugated member with the straps secured at the crowns thereof and the bracket secured at the valleys thereof.

5. The assembly of claim 1 in which the bracket is an elongated member and the first ends are aligned parallel to the longitudinal axis of said bracket with the straps extending transverse to said axis.

6. The assembly of claim 1 in which the bracket is provided with a formation to receive means for mechanically securing an electrical device to the bracket in such position that terminals of this electrical device are positioned for electrical securement to said straps at the first ends thereof.

7. The assembly of claim 6 in which the bracket is an elongated member and the first ends are aligned parallel to the longitudinal axis of said bracket with the straps extending transverse to said axis.

8. The assembly of claim 7 also comprising means carried by said bracket for mechanically securing said assembly to a panel mounting rail.

9. The assembly of claim 8 in which the insulating means is a corrugated member with the straps secured at the crowns thereof and the bracket secured at the valleys thereof.

10. The assembly of claim 9 also comprising a nut individual to each of said straps for making electrical connections to said straps, means floatingly securing said nuts to their individual straps at their first ends.

11. The combination comprising a distribution panel and a combination unit; said panel comprising an enclosure, a pair of parallel spaced mounting rails within said enclosure, a plurality of bus bars at least three in number within said enclosure, said bus bars mounted in spaced parallel insulating relationship between said rails and extending parallel thereto; said combination unit disposed within said enclosure and positioned forward of said bus bars; said unit comprising a single housing, a first electrical device, a second electrical device, and wiring means connecting said devices in electrical series; said electrical devices being disposed within said housing; said wiring means disposed within said housing and extending transverse to said bus bars; and bus means electrically connecting only one of said devices directly to said bus bars.

12. The combination of claim 11 in which one end of the housing is secured to one of said mounting rails and the other end of the housing is secured to the other of the mounting rails.

13. The combination of claim 12 in which the bus means extends into the housing at an end thereof; and additional wiring means extending through said housing at the end thereof, remote from said bus means for electrically connecting said combination unit to a load.

References Cited by the Examiner

UNITED STATES PATENTS

| | | | |
|---|---|---|---|
| 1,958,916 | 5/1934 | Hammerly | 247—10 |
| 2,942,157 | 6/1960 | Davis | 317—119 |
| 3,073,936 | 1/1963 | Baird | 200—168 |

ROBERT K. SCHAEFER, *Primary Examiner.*

KATHLEEN H. CLAFFY, *Examiner.*

H. J. RICHMAN, M. GINSBURG, *Assistant Examiners.*